US012573904B2

(12) United States Patent
    Mihaila

(10) Patent No.: US 12,573,904 B2
(45) Date of Patent: Mar. 10, 2026

(54) ELECTRIC MOTOR STATOR COMPRISING A SYSTEM FOR COOLING THE COILS BY OIL

(71) Applicant: Whylot SAS, Cambes (FR)

(72) Inventor: Vasile Mihaila, Figeac (FR)

(73) Assignee: Whylot SAS, Cambes (FR)

( * ) Notice: Subject to any disclaimer, the term of this patent is extended or adjusted under 35 U.S.C. 154(b) by 134 days.

(21) Appl. No.: 18/256,886

(22) PCT Filed: Dec. 3, 2021

(86) PCT No.: PCT/IB2021/061277
    § 371 (c)(1),
    (2) Date: Jun. 9, 2023

(87) PCT Pub. No.: WO2022/123408
    PCT Pub. Date: Jun. 16, 2022

(65) Prior Publication Data
    US 2024/0022129 A1      Jan. 18, 2024

(30) Foreign Application Priority Data

Dec. 10, 2020    (FR) ...................................... 2013016

(51) Int. Cl.
    *H02K 3/24*          (2006.01)
    *H02K 1/12*          (2006.01)
            (Continued)
(52) U.S. Cl.
    CPC ................. *H02K 3/24* (2013.01); *H02K 1/12* (2013.01); *H02K 1/27* (2013.01)
(58) Field of Classification Search
    CPC .. H02K 9/19; H02K 3/24; H02K 1/12; H02K 1/27; H02K 5/203; H02K 1/20
            (Continued)

(56) References Cited

U.S. PATENT DOCUMENTS 4,602,872 A * 7/1986 Emery ..................... G01K 3/02
                                                    374/E3.003
6,776,590 B2 * 8/2004 Cooper .................. H02K 21/24
                                                    310/156.32
                (Continued)

FOREIGN PATENT DOCUMENTS

CN        209001745        6/2019
CN        111725939 A  *  9/2020  ............... H02K 5/20
                (Continued)

OTHER PUBLICATIONS

International Search Report and Written Opinion dated Feb. 8, 2022 from IA PCT/IB2021/061277.

*Primary Examiner* — Burton S Mullins
(74) *Attorney, Agent, or Firm* — Crockett & Crockett, PC; K. David Crockett, Esq.

(57)                ABSTRACT

The invention relates to a stator of an electric motor stator equipped with coils (3, 3*a*, 3*b*) and comprising an oil cooling system for the coils. The coils (3, 3*a*, 3*b*) are arranged leaving a gap (15) between them and defining inside and outside circumferences. The system comprises oil inlet and outlet manifolds pierced by orifices to send or recover oil to or from the coils. Each inlet orifice (10) is associated with a respective coil (3, 3*a*, 3*b*), one of the manifolds surrounding the inside circumference while the other manifold surrounds the outside circumference, a flow of oil exiting each inlet orifice (19) circulating mostly in the gap (15) between its associated coil (3) and at least one of the two adjacent coils (3*a*, 3*b*) and then exiting via an outlet orifice.

12 Claims, 3 Drawing Sheets

(51) Int. Cl.
H02K 1/20       (2006.01)
H02K 1/27       (2022.01)
H02K 9/19       (2006.01)

(58) Field of Classification Search
USPC ..................................... 310/86, 68 C, 156.32
See application file for complete search history.

(56)                      References Cited

U.S. PATENT DOCUMENTS

| | | | |
|---|---|---|---|
| 10,355,570 B2 * | 7/2019 | Inoue .................... | H02K 9/193 |
| 10,498,199 B2 | 12/2019 | Nishikawa et al. | |
| 12,334,786 B2 * | 6/2025 | Bossecker ............... | H02K 3/28 |
| 12,355,336 B2 * | 7/2025 | Chen ........................ | H02K 1/20 |
| 2017/0012480 A1 | 1/2017 | Woolmer | |
| 2022/0278579 A1 * | 9/2022 | Bossecker .............. | H02K 1/182 |

FOREIGN PATENT DOCUMENTS

| | | | | | |
|---|---|---|---|---|---|
| DE | 102014205034 | | 9/2015 | | |
| EP | 3764526 | | 1/2021 | | |
| FR | 3086465 | | 3/2020 | | |
| JP | 2005-261083 | * | 9/2005 | .............. | H02K 9/19 |
| JP | 2005261083 A | * | 9/2005 | .............. | H02K 9/19 |
| JP | 2006-033965 | * | 2/2006 | .............. | H02K 9/19 |
| JP | 6270213 | * | 1/2018 | .............. | H02K 9/19 |
| WO | WO2020147551 | | 7/2020 | | |

* cited by examiner 19          17          18

ELECTRIC MOTOR STATOR COMPRISING A SYSTEM FOR COOLING THE COILS BY OIL

This invention relates to an electric motor stator equipped with coils and comprising a system for cooling the coils using oil as the coolant fluid, as well as an electromagnetic motor or generator equipped with a stator of this type.

This invention has an advantageous but not restrictive application for an electric motor that delivers high power with a high speed of rotation of the rotor. A motor or generator of this type can be used, for example, as an electromagnetic motor or generator in a fully electric or hybrid automotive vehicle.

Advantageously but not restrictively, the electromagnetic motor or generator can comprise at least one rotor framed by two stators, whereby these elements can be superimposed one on top of the other, being separated by at least one air gap on a single shaft.

In high-speed applications, it is necessary to have not only a compact system made possible by the reduction of the size and weight of the motor for optimum performance, but also very good mechanical strength of the rotating part, i.e. of the rotor or rotors, to improve the reliability of the system. To achieve optimum performance it is therefore necessary to reduce losses.

These losses can occur in the rotor or rotors of the electric motor or in the stator or stators. With regard to the rotors, eddy current losses in the magnets have been significantly reduced, in particular by proposing ironless rotors or by proposing magnetic poles constituted by a plurality of small unitary magnets.

The principal losses are therefore now losses caused by the Joule effect in the coils of the stators, as well as the magnetic losses in the iron of the stators.

The majority of the heating occurs in the stators of the electric motors and must be reduced as effectively as possible.

Different solutions exist, for example a circulation of coolant fluid in a circuit machined into the housing of the electric motor or a circulation of oil at the level of the winding overhangs. The prior art also includes a stator comprising a system for cooling the coils that uses oil as the coolant fluid.

Conventionally, the coils are arranged one next to another, leaving a small gap between two adjacent coils and such that together they define the inside and outside circumferences in the stator.

The cooling system comprises an oil inlet manifold and an oil outlet manifold, the inlet manifold being pierced by inlet orifices to send the oil over the coils and the outlet manifold being pierced by outlet orifices to recover the oil.

This is known in particular from USA-A-2017/012480, which provides a circulation of oil as the coolant fluid between the coils of a stator. To improve the evacuation of stator losses this prior art document also proposes that the coils are bathed in a circuit of coolant fluid, because these coils are the origin of currents that result in eddy current losses or core losses.

In this prior art document, it is shown that that the oil penetrates via the stator via two inputs and runs around the coils as it passes, between two adjacent coils if necessary. On the other hand, for coils located far from the two feed inputs, it is the oil that has already exchanged heat with the coils located at the inlet that effects the cooling of the distant coils, which does not guarantee a uniform cooling of the coils.

The circulation of the coolant fluid, which is oil, can be made more difficult by the numerous regular and individual losses of head, which increase the oil pressure and therefore make it difficult to leakproof the oil circuit in the electric motor.

Therefore a uniform cooling of the coils is not guaranteed for any arbitrary circulation of oil because the first coils cooled by the circulation of fluid are cooled to a greater extent than the subsequent coils as the fluid is heated and loses its heat exchange capacity.

It is therefore very difficult to achieve a uniform oil circulation between each winding overhang. When the coolant fluid arrives via an injection hole, the coolant fluid must circulate through the entire stator, cooling the coils one after the other in a series process, and is then the cause of regular losses.

In addition, the temperature increase is not uniform, which reduces the cooling capacity of the cooling device that uses a circulating coolant fluid.

JP-A-2006/033965 describes an electric motor stator equipped with coils and comprising a system for cooling the coils with oil as the coolant fluid, the coils being arranged alongside one another, leaving a gap between two adjacent coils and together defining the internal and external circumferences in the stator.

The cooling system comprises an element similar to an oil inlet manifold and an element similar to an oil outlet manifold, one of the manifolds running around the inside circumference while the other manifold runs around the outside circumference, a flow of oil exiting the inlet element circulating mostly in the gap between an associated coil and at least one of the two coils adjacent to the associated coil, then exiting via the outlet element.

In this document, it is shown that that the oil penetrates into the stator via at least one feed inlet and runs around the coils as it passes, between two adjacent coils if necessary. On the other hand, for coils far from said at least one feed inlet, it is the oil that has already exchanged heat with the coils located at the inlet that effects the cooling of the distant coils, which prevents a uniform cooling of all the coils.

Moreover, the inlet and outlet elements are not on the exterior of the compartment comprising the coils but are integrated into this compartment, which does not make it possible to obtain the same cooling oil temperature for all the coils, the coils near an injection inlet making up the inlet element being cooled more effectively by the colder oil than the other coils traversed by the oil as it is heated when it comes into contact with the top or bottom winding overhangs of the coils closest to an injection inlet, advantageously with the top winding overhang.

EP-A-3 764 526 is an interfering document, i.e. it has a date prior to the filing date of the present application but was not published as of this filing date.

This document describes a stator equipped with coils and inlet and outlet manifolds but does not describe any means that would make it possible to provide uniform cooling for all the coils with an oil flow specifically directed from the manifold toward each coil considered individually.

The problem addressed by the present invention is to improve the cooling of the coils of a stator of an electromagnetic motor or generator by a coolant fluid in the form of oil, having the smallest possible losses of head to avoid oil overpressures in the cooling chambers in relation to the air gap between the stator and rotor.

For this purpose the present invention relates to a stator of an electric motor equipped with coils and comprising a system for cooling the coils using oil as a coolant fluid, the coils being arranged one alongside another leaving a gap between two adjacent coils and together defining the inside and outside circumferences in the stator, the cooling system comprising an oil inlet manifold and an oil outlet manifold, the inlet manifold being pierced by inlet orifices to send oil over the coils and the outlet manifold being pierced by outlet orifices to recover the oil, characterized in that each coil is associated with at least one inlet orifice, one of the manifolds running around the inside circumference while the other manifold runs around the outside circumference, an oil flow exiting each inlet orifice circulating mostly in the gap between its associated coil and at least one of the two coils adjacent to the associated coil, then exiting via one of the outlet orifices, each coil being associated with at least one inlet orifice, the oil flow emerging from an inlet orifice circulating mostly in the gap between its associated coil and each of the two coils adjacent to the associated coil, then exiting via one of the outlet orifices, the oil flow of each inlet orifice being divided into two flows with one flow for each gap.

By associating at least one oil inlet orifice with each coil, a uniform cooling of the coils among one another is achieved, each coil being cooled by oil at the same temperature because it comes directly from the inlet manifold and without having been previously heated by other coils.

The teaching of the present invention is the creation of a number of injection channels that form gaps between adjacent coils identical to the number of coils and advantageously stator teeth, each bearing a coil, thereby creating oil circulations that completely surround each coil. The numerous oil circulations through the gaps are therefore in parallel and not in series and are almost simultaneous.

This has the advantage of creating much lower flow resistances, and therefore much lower overpressures necessary to have the oil circulate between the coil heads.

"Mostly" means that the injected oil circulates essentially via the gaps between coils, given that the quantities of oil passing from one coil to another over the surfaces of the coils forming respectively the inside and outside circumferences are smaller, or even negligible, corresponding to less than 20% of the oil that circulates in the gaps.

According to the invention, there can be a plurality of inlet orifices dedicated to one coil, although that is not preferred, but there is always at least one oil inlet orifice associated with a coil.

In this embodiment, therefore, the fact that the flow of oil from each inlet orifice is divided into two flows, with one flow for each gap, makes it possible for the two sides of each coil, each bordering a gap from an adjacent coil, to be cooled simultaneously. Advantageously, the two sides are traversed by the same flow to obtain a uniform cooling of the two sides of the coil.

Advantageously, said at least one inlet orifice associated with the coil is at the same distance from the two gaps between the associated coil and each of the two adjacent coils, so that the two flows therefore have the same flow rate.

Advantageously, at least one outlet orifice is associated with each coil, the inlet and outlet orifices being in pairs, there being an equal number of them.

In this preferred embodiment, after passing through a gap between two coils, the heated oil is recovered and evacuated individually for each coil. This makes it possible to avoid losses of head in the cooling circuit and facilitates the evacuation of the oil. Therefore there is a similar oil flow entering and exiting the coils for a good flow of oil inside the stator and outside the stator.

Advantageously, the coils have a trapezoidal cross-section with a small base and a large base, or a triangular cross section with a base opposite a peak, the large bases of the coils with the trapezoidal cross-section or the bases of the coils with a triangular section defining the outside circumference and the small bases of the coils with a trapezoidal cross-section or the peaks of the coils with a triangular cross section defining the inside circumference.

The large bases form the largest with of a coil or coil head, while the small bases for a trapezoidal cross-section or the peaks opposite the base for a triangular cross-section form the smallest width or bottom end winding.

Oil as a coolant fluid is injected over each coil from its widest side directly onto this large width, which requires more cooling than its small width. The result is a more effective cooling of each coil.

Advantageously, the inlet orifices are positioned perpendicular to the outside circumferences and the outlet orifices are positioned perpendicular to the inside circumference.

This makes it possible to bring the inlet orifices of the inlet manifold close to the top end windings and the outlet orifices of the outlet manifold close to the bottom end windings to facilitate the injection of the oil over each coil, as well as its recovery at the coil exit.

Advantageously, the inlet and outlet manifolds are circular, having a diameter corresponding respectively to the outside circumference and to the inside circumference.

This allows the circulation of oil in the manifolds to follow the arrangement of the coils and to cool the coils uniformly in relation to one another.

Advantageously, the inlet and outlet manifolds are each in the form of a channel comprising respectively an oil inlet or an oil inlet.

Before supplying the coils via a plurality of inlet orifices, at least one of which is dedicated to a respective coil, it is necessary to provide a large quantity of oil which is significantly greater than the quantity of oil exiting the inlet manifold via each orifice.

It follows that the inlet channel must have a sufficiently large cross-section to allow it to carry a quantity of oil sufficient for all the coils, so that all the coils are cooled simultaneously and uniformly. The cross-section of the channel is advantageously related to the number of inlet orifices and their cross-section.

The stator advantageously comprises at least one temperature probe.

This makes it possible to measure the cooling of the coils in the stator. It is advantageous to provide a plurality of temperature probes in the stator, preferably in proximity to the coils.

The coils are advantageously concentric, each being supported by a respective tooth. Concentric coils of this type have the advantage that they are easy to fabricate.

The invention further relates to an electromagnetic motor or generator comprising a housing surrounding at least one rotor and at least one stator, characterized in that said at least one stator is as described above, the housing being traversed by an oil inlet nozzle and an oil outlet nozzle connected respectively to the inlet manifold or to the outlet manifold and an impermeable wall separating said at least one stator from said at least one rotor.

The housing of the motor or of the generator is simplified by the fact that it is necessary to provide only one inlet nozzle and one outlet nozzle, while the prior art might require a plurality of inlet nozzles and a plurality of outlet nozzles. The impermeable wall serves to protect the rotor or rotors from the flow of oil originating from the stator or stators.

Advantageously, said at least one rotor comprises a plurality of magnetic poles, each magnetic pole being constituted by a plurality of unitary magnets connected to one another by adhesive, resin or composite with the optional interposition of a mesh holding the unitary magnets.

Advantageously, each magnetic pole is individually coated in a layer of composite.

These characteristics contribute to the achievement of the principal preferential advantages of the present invention. The invention proposes to replace one or a plurality of large magnets with a plurality of small magnets. Therefore a magnetic flux is created by a multitude of small magnets, the number of which can be at least 20 and can even exceed 100 per magnetic pole.

A rotor of the prior art can comprise from 1 to 10 magnets forming magnetic poles, while the present invention provides many more small size magnets in each magnetic pole.

It is necessary not to confuse a magnetic pole, because a rotor can carry 5 to 10 or even more of them, with unitary magnets which are present in a much greater number, because a rotor can carry several hundreds of them, for example.

This makes it possible to obtain a rotor which, among other advantages, can rotate at a high speed and which does not contain iron, which limits the rotor losses. It has been determined that a plurality of unitary magnets results in a magnet structure which is stronger on the level of the overall flexure of the rotor while generating very little heat on account of the low losses generated, the heat dissipated by the unitary magnets being less than the heat dissipated by a corresponding equivalent larger one-piece magnet.

The magnet structure forming the magnetic pole can comprise a layer of nonconductive composite coating the unitary magnets, which can advantageously be located in a mesh structure. Moreover, the mechanical strength of the magnet structure can be high and the coating can be applied easily, in particular by injection of the composite over an arrangement of unitary magnets held in place with respect to one another by any desired means.

With a rotor of this type, it is advantageous to associate one or more stators comprising teeth, advantageously made of iron, with concentric coils, which facilitates the fabrication process.

Therefore the present invention takes the opposite approach to that followed by many manufacturers of electromagnetic motors and generators. It is known that innovative effort can be devoted to the stators by designing increasingly complex coils which are difficult to design.

On the contrary, the inventive approach taken by the present invention also relates to a rotor that contains no iron and is coated with a composite material containing magnetic poles, each constituted by a plurality of magnets. This has made it possible to use concentric coils for the stator or stators, while a concentric coil of this type is not entirely satisfactory with one-piece permanent magnets as employed in the prior art.

It has been determined that the utilization of an association of this type of a composite rotor with at least one iron stator comprising iron teeth or studs and concentric coils for the stator results in synergy with regard to the power of the motor or the generator used as well as ease of fabrication and high mechanical strength of the motor or the generator.

The principal inventive contribution of the present invention to the prior art has also been to further increase this synergy by eliminating the principal disadvantage of a stator of this type, which is the generation of a large amount of heat during the operation of the coils.

This problem has been resolved by the integration of a cooling system in a stator as described above.

A motor of this type can be an axial flux motor.

The following description refers to all the figures considered in combination. When reference is made to one or more specific figures, these figures are to be considered in combination with the other figures for the identification of the designated numeric references.

Figure 1:
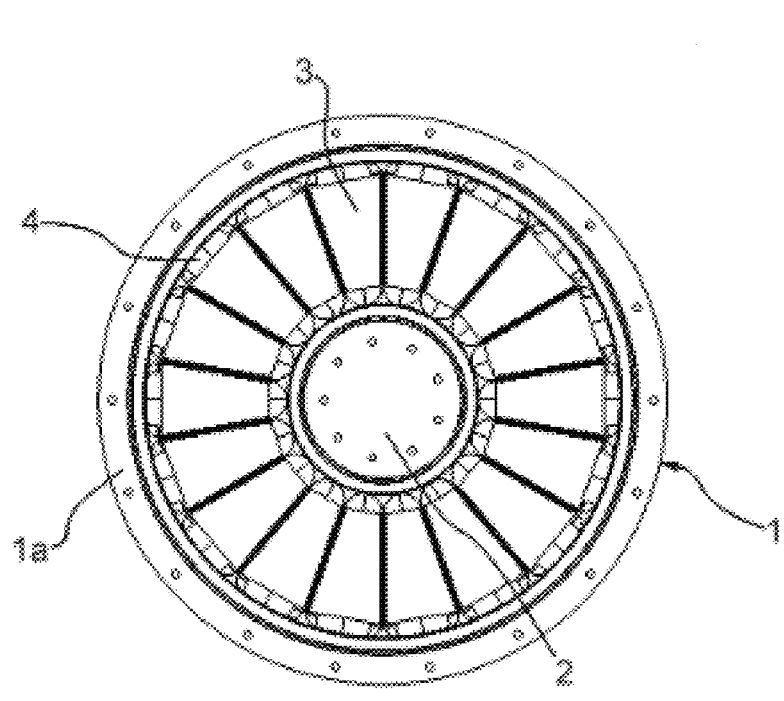
FIG. 1 shows a front view of a stator according to one embodiment of the present invention after removal of a seal plate designed to separate the stator from the associated rotor to form an electromagnetic motor or generator.

With particular reference to FIG. 1, this figure shows a stator 1 of an electromagnetic motor or generator that can comprise one or more stators and one or more rotors. This FIG. 1 is a front view of the stator 1 turned toward the rotor, thereby defining the limits of an air gap between the stator 1 and the rotor.

As can be seen in this figure, the electric motor stator 1, according to one non-restricting embodiment of the present invention, has a circular shape for an axial flux motor, which is not restrictive in the context of the present invention. Reference number 2 indicates the center of the stator 1 or of the housing 1a surrounding the stator 1.

The stator 1 is equipped with coils 3 arranged circumferentially around the center of the stator 1, each advantageously mounted on a tooth 4. Only one coil 3 is referenced in this figure, although what has been stated above for each coil is applicable to the other coils.

Figure 2:
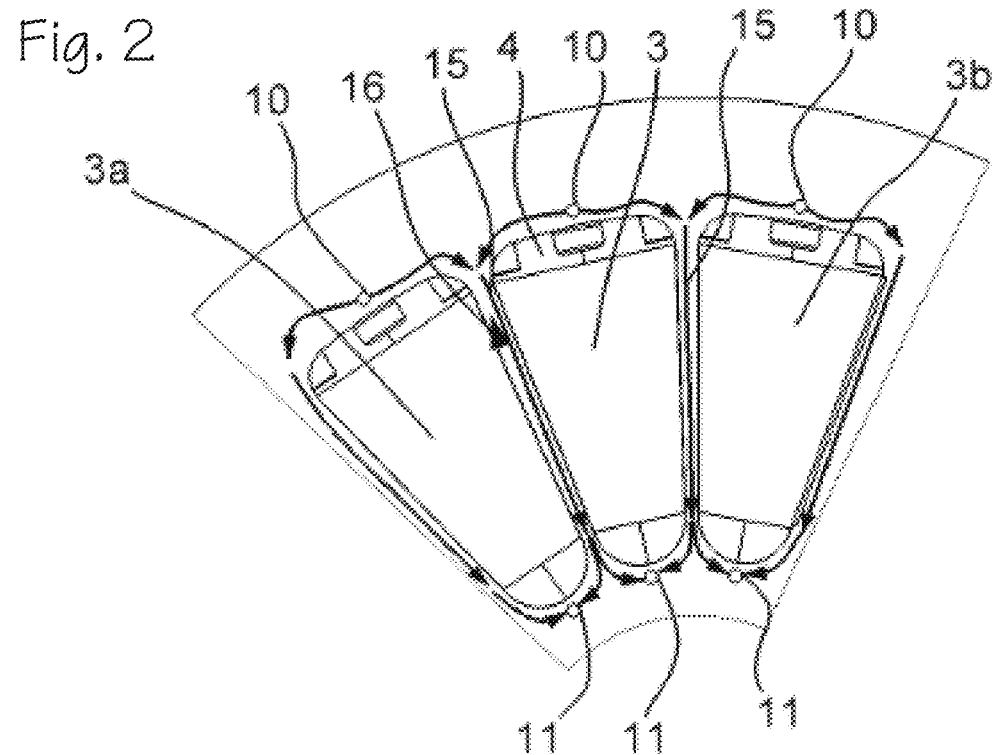
FIG. 2 shows an enlarged view of three coils of a stator according to one embodiment of the present invention, the path of the oil between two adjacent coils being identified by arrows in this figure, the oil flow exiting an inlet orifice and passing the two lateral sides of the associated coil.

In FIGS. 1 and 2, the coils 3, 3a, 3b are arranged one next to another, leaving a gap 15 between two adjacent coils and together defining the inside and outside circumferences in the stator 1.

Figure 3:
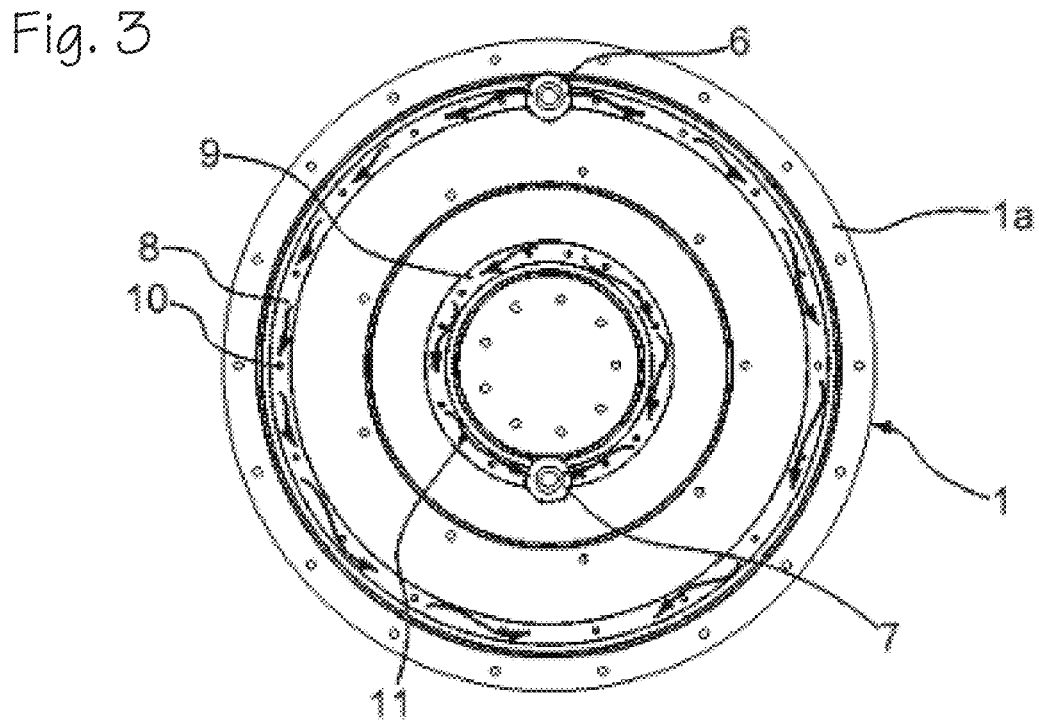
FIG. 3 shows a rear view of a stator according to one embodiment of the present invention showing the oil inlet and outlet manifolds and the path of the oil in the manifolds identified by arrows.

With reference more particularly to FIGS. 1 to 3, the stator 1 comprises a cooling system of the coils 3, 3a, 3b using oil as the coolant fluid. This cooling system comprises an oil inlet manifold 8 and an oil outlet manifold 9.

The inlet manifold 8 is pierced by inlet orifices 10 to send oil over the coils 3, 3a, 3b, and the outlet manifold 9 is pierced by outlet orifices 11 to recover the oil, a single inlet orifice 10 and a single outlet orifice 11 being identified in FIG. 3.

With reference to FIGS. 2 and 3 in particular, each considered in combination with the other figures, each coil

3, 3*a*, 3*b* is associated with at least one inlet orifice 10, i.e. there can be one inlet orifice 10 for a coil 3, 3*a*, 3*b* but also a plurality of inlet orifices 10 for a single coil.

In FIG. 2, each inlet orifice 10 is located in the median part of a winding overhang 3, 3*a*, 3*b* which is the widest base of a coil 3, 3*a*, 3*b*, although this arrangement is not mandatory.

In this case, the oil flow emerging from an inlet orifice 10 circulates mostly in the gap 15 between its associated coil 3 and each of the two coils 3*a*, 3*b* adjacent to the associated coil 3, as illustrated by the arrows in FIG. 2.

Also in this case, each flow coming from a principal flow from an inlet orifice 10 being separated into two flows, is mixed with a flow coming from an adjacent coil 3*a*, 3*b*, also resulting from the separation of a principal flow issuing from an inlet orifice 10 associated with the adjacent coil 3*a*, 3*b*.

It follows that the flow of oil from each inlet orifice 10 is divided into two flows with one flow for each gap 15 separating a coil 3 from adjacent coils 3*a*, 3*b*. The two sides of each coil 3, 3*a*, 3*b*, each bordering a gap 15 with an adjacent coil are therefore cooled simultaneously.

By superimposing FIGS. 1 and 3, one of the manifolds, in FIG. 3 the outlet manifold 9, surrounds the inside circumference while the other manifold, in FIG. 3 the inlet manifold 8, surrounds the outside circumference.

A flow of oil indicated by the arrows exits each inlet orifice 10, then circulates mostly in the gap 15 between its associated coil 3 and at least one of the two coils 3*a*, 3*b* adjacent to the associated coil 3. This oil flow is then recovered in the outlet manifold 9, then exits via one of the outlet orifices 11.

However, it is possible that there may be only one outlet orifice for all the coils, although this configuration is not preferred.

There can be a different number of outlet orifices 11 and inlet orifices 10. For example, although this configuration is preferred, it is possible to not associate one outlet orifice 11 with each coil.

In the non-restricting case of a plurality of inlet orifices 10 for each coil 3, 3*a*, 3*b*, one of these inlet orifices 10 can be closed under certain operating conditions of the stator 1 for which accelerated cooling is not required.

An inlet orifice 10 of this type, advantageously provided with a flap valve, can be opened by increasing an oil pressure in the inlet manifold 8. This makes it possible to regulate the cooling to match the actual operating conditions of the stator 1 and the heating of the coils 3, 3*a*, 3*b*.

As illustrated in FIG. 2, when the oil flow from each inlet orifice 10 is divided into two flows with one flow for each gap 15, to achieve a uniform cooling of the two sides of the coil 3, 3*a*, 3*b*, it is advantageous for the two sides to be traversed at the same flow rate.

Therefore the inlet orifice 10 associated with the coil 3, 3*a*, 3 can be at an equal distance from the two gaps 15 between the associated coil 3 and each of the two adjacent coils 3, 3*b*, the two flows therefore having the same flow rate.

Preferably but not restrictively, at least one outlet orifice 11 is associated with each coil 3, 3*a*, 3*b*, the inlet orifices 10 and outlet orifices 11 being arranged in pairs, because they are present in equal numbers, in particular in the case where each coil 3, 3*a*, 3*b* is associated with only one inlet orifice 10 and one outlet orifice 11.

In a non-restricting manner, there can be 18 coils 3, 3*a*, 3*b* arranged circumferentially on the stator 1 with 18 inlet orifices 10 and 18 outlet orifices 11.

Therefore, the oil arrives directly from the inlet manifold 8 over each coil 3, 3*a*, 3*b* and as quickly as possible exits the magnetic circuit once it has cooled its associated coil 3 to be recovered in the outlet manifold 9.

With reference to FIG. 2 in particular, the coils 3, 3*a*, 3*b* can have a trapezoidal cross-section with a small base and a large base, the small base being shown rounded off in this FIG. 2.

Alternatively, although not shown in the figures, the coils can have a triangular cross section with a base opposite a summit corresponding to a small base essentially reduced to a point.

In both these cases, the large bases of the coils 3, 3*a*, 3*b* having a trapezoidal cross-section or the bases of the coils having a triangular cross section can define the above-mentioned outside circumference.

The small bases of the coils 3, 3*a*, 3*b* having a trapezoidal cross-section or the peaks of the coils having a triangular cross section can define the inside circumference.

As can be shown by superimposing FIGS. 1 and 3 drawn to the same scale, the inlet orifices 10 can be positioned perpendicular to the outside circumference and the outlet orifices 11 can be positioned perpendicular to the inside circumference.

The inlet and outlet manifolds can be circular, having a diameter corresponding respectively to the outside circumference and to the inside circumference defined by the coils 3, 3*a*, 3*b*.

Therefore, in the case of an inlet manifold 8 extending to the exterior of an outlet manifold 9, it is the large bases of the coils 3, 3*a*, 3*b* having a trapezoidal cross-section or the bases of the coils having a triangular cross-section that are cooled first by the oil directly exiting the inlet manifold 8 and that has not yet exchanged heat with the coil in question or another coil.

Because the manifolds must transport a sufficient quantity of oil for all the coils 3, 3*a*, 3*b* and since the oil flows can vary, the inlet manifold 8 and outlet manifold 9 can each be in the form of a channel, comprising an oil inlet or outlet respectively.

A ratio can be established between, on the one hand, the cross-section of the channel forming the inlet manifold 8 and, on the other hand, the cross-section of an inlet orifice 10 to obtain an optimum and uniform cooling/temperature ratio for all the coils. This ratio is a function of the type of motor, for example its size, its geometry, the number of teeth and the type of coil.

In the preferred embodiment, the coils 3, 3*a*, 3*b* can be concentric, each being supported by a respective tooth 4, as illustrated in particular in FIG. 2, which identifies the tooth of the central coil 3.

To measure the temperature in the stator 1, the stator 1 can comprise at least one temperature probe 16, advantageously in a plurality of different locations near the coils 3, 3*a*, 3*b*.

Figure 4:
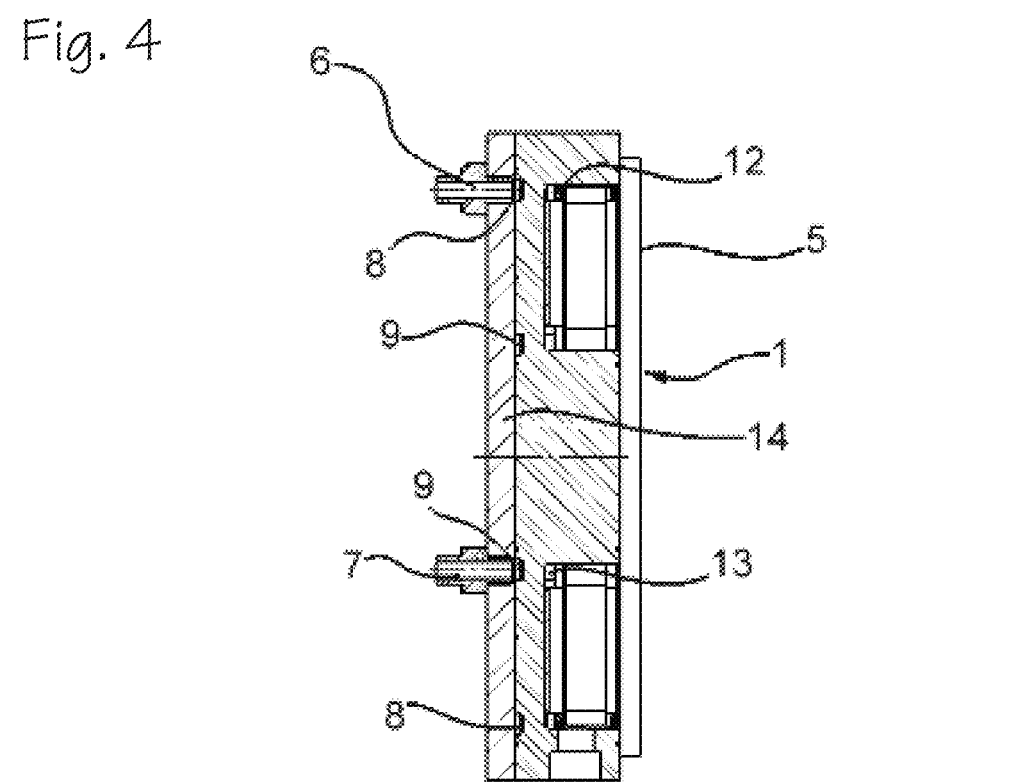
FIG. 4 shows an axial cross-section of the stator according to one embodiment of the present invention showing the exchange of the oil between the inlet manifolds and outlet manifolds with an inlet orifice and an outlet orifice respectively.

With reference in particular to FIGS. 2 to 4, the oil is injected via an inlet nozzle 6 into the inlet manifold 8, advantageously axisymmetrically, and which supplies all the inlet orifices 10 for the supply of the cavity of the magnetic circuit comprising the coils 3, 3*a*, 3*b*, each advantageously supported by a tooth.

The oil rises to an impermeable wall 5 separating the stator 1 from a rotor not shown in these three figures, and passes between the coils 3, 3*a*, 3*b* to arrive in the outlet orifices 11, the number of which is advantageously identical to the number of teeth and to the number of inlet orifices 10, and is then evacuated by the outlet manifold 11 via the outlet nozzle 7.

Reference number 14 indicates the exterior plate designed to be located opposite a rotor, not shown in these figures but referenced as number 17 in FIG. 5, and reference numbers 12 and 13 respectively indicate the cavities below the winding overhangs facing the oil inlet manifold 8 and below the bottom end windings opposite the oil outlet manifold 9.

Figure 5:
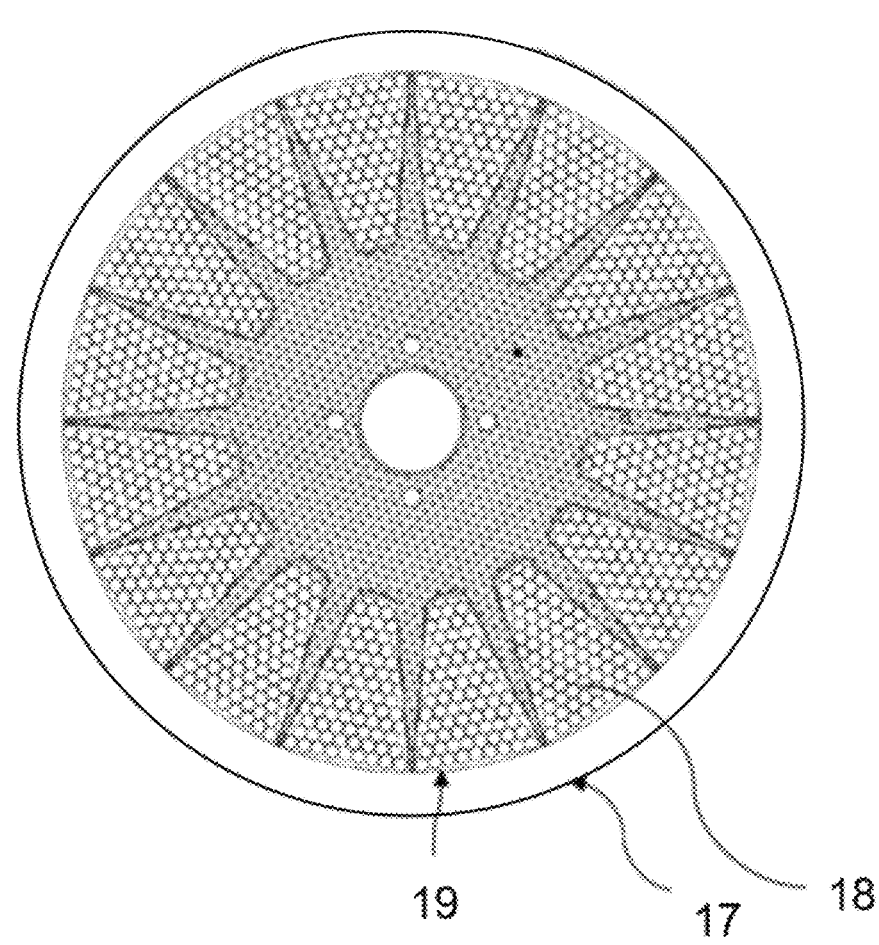
FIG. 5 shows a front view of a rotor that can be associated with a stator as illustrated in FIGS. 1 to 4 to form an electromagnetic motor or generator according to the present invention.

With reference in particular to FIG. 3 showing the stator 1 and to FIG. 5 showing a rotor 17, the invention further relates to an electromagnetic motor or generator.

The motor or generator comprises a housing 1*a* surrounding at least one rotor 17 and at least one stator 1. The stator or stators 1 are as described above, incorporating a cooling system.

The housing 1*a* is traversed by the oil inlet nozzle 6 and the oil outlet nozzle 7 connected respectively to the inlet manifold 8 or to the outlet manifold 9 and an impermeable wall 5, visible in particular in FIG. 4, separating said at least one stator 1 from said at least one rotor 17.

As visible in FIG. 5, the rotor 17 or each rotor 17 can comprise a plurality of magnetic poles 19, a single one of which is identified in FIG. 5.

The rotor 17 or each rotor 17 can be made of composite to reduce iron losses. Each magnetic pole 19 can be constituted by a plurality of unitary magnets 18 connected to one another by adhesive or resin, with the optional interposition of a mesh holding the unitary magnets 18.

FIG. 5 identifies only one unitary magnet 18 and only one magnetic pole 19, although what has been stated respectively for the unitary magnet 18 and the magnetic pole 19 is valid for all the unitary magnets and all the magnetic poles.

Moreover, to strengthen the solidity of the magnetic pole 19, each magnetic pole 19 can be individually coated in a layer of composite.

With regard to the figures, the above description relates essentially to an axial flux motor, although the present invention can be applied to any type of motor, in particular a radial flux or mixed flux motor or generator.

I claim:

1. A stator (1) of an electric motor equipped with coils (3, 3*a*, 3*b*) and comprising a system for cooling the coils (3, 3*a*, 3*b*) using oil as a coolant fluid, the coils (3, 3*a*, 3*b*) being arranged alongside one another leaving a gap (15) between two adjacent coils (3*a*, 3*b*) and together defining the inside and outside circumferences in the stator (1), the cooling system comprising an oil inlet manifold (8) and an oil outlet manifold (9), one of the manifolds running around the inside circumference while the other manifold runs around the outside circumference, a flow of oil exiting the inlet manifold (8) circulating mostly in the gap (15) between an associated coil (3) and at least one of the two coils (3*a*, 3*b*) adjacent to the associated coil (3) then exiting via the outlet manifold (9), characterized in that the inlet manifold (8) is pierced by a plurality of inlet orifices (10) to send the oil over the coils (3, 3*a*, 3*b*) and the outlet manifold (9) is pierced by a plurality of outlet orifices (11) to recover the oil, each coil (3, 3*a*, 3*b*) being associated with at least one inlet orifice (10) of the a plurality of inlet orifices (10), the oil flow emerging from said at least one inlet orifice (10) circulating mostly in the gap 15 between its associated coil (3) and each of the two coils (3*a*, 3*b*) adjacent to the associated coil (3), then exiting via at least one of the outlet orifices (11) of the plurality of outlet orifices, the flow of oil from each inlet orifice (10) being divided into two flows with one flow for each gap (15); wherein each outlet orifice (11) of the plurality of inlet orifices (10) is associated with a coil (3, 3*a*, 3*b*), the inlet orifices (10) and outlet orifices (11) being paired, being present in equal numbers.

2. A stator (1) according to claim 1 in which said at least one inlet orifice (10) associated with the coil (3, 3*a*, 3*b*) is at an equal distance from the two gaps (15) between the associated coil (3) and each of the two adjacent coils (3*a*, 3*b*), the two flows having the same flow rate.

3. A stator (1) according to claim 1, in which the coils (3, 3*a*, 3*b*) have a trapezoidal cross-section with a small base and a large base, the large bases of the coils (3, 3*a*, 3*b*) with the trapezoidal cross-section defining the outside circumference, and the small bases of the coils (3, 3*a*, 3*b*) with the trapezoidal cross-section defining the inside circumference.

4. A stator (1) according to claim 1, in which the inlet orifices (10) are positioned perpendicular to the outside circumferences and the outlet orifices (11) are positioned perpendicular to the inside circumference.

5. A stator (1) according to claim 1, in which the inlet manifold (8) and outlet manifold (9) are circular, having a diameter corresponding respectively to the outside circumference and to the inside circumference.

6. A stator (1) according to claim 1, in which the inlet manifold (8) and outlet manifold (9) are each in the form of a channel comprising an oil inlet or an oil outlet respectively.

7. A stator (1) according to claim 1, which comprises at least one temperature probe (16).

8. A stator (1) according to claim 1, in which the coils (3, 3*a*, 3*b*) are concentric, each being supported by a respective tooth (4).

9. An electromagnetic motor or generator comprising a housing (1*a*) surrounding at least one rotor (17) and at least one stator (1), characterized in that said at least one stator (1) is according to claim 1, the housing (1*a*) being penetrated by an oil inlet nozzle (6) and an oil outlet nozzle (7) connected respectively to the inlet manifold (8) or to the outlet manifold (9) and an impermeable wall (5) separating said at least one stator (1) from said at least one rotor (17).

10. A motor or generator according to claim 9, in which said at least one rotor (17) comprises a plurality of magnetic poles (19), said at least one rotor (17) being made of composite.

11. A motor or generator according to claim 9, in which each magnetic pole (19) is constituted by a plurality of unitary magnets (18) connected to one another by adhesive, resin or composite.

12. A motor or generator according to claim 11 in which each magnetic pole (19) is individually coated with a layer of composite.

* * * * *